US 12,475,377 B2

(12) United States Patent
Clement et al.

(10) Patent No.: US 12,475,377 B2
(45) Date of Patent: Nov. 18, 2025

(54) NEURAL COMMAND LINE INTERFACE EXAMPLE GENERATION

(71) Applicant: MICROSOFT TECHNOLOGY LICENSING, LLC., Redmond, WA (US)

(72) Inventors: Colin Bruce Clement, Seattle, WA (US); Roshanak Zilouchian Moghaddam, Kirkland, WA (US); Neelakantan Sundaresan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1231 days.

(21) Appl. No.: 17/234,391

(22) Filed: Apr. 19, 2021

(65) Prior Publication Data

US 2022/0253712 A1    Aug. 11, 2022

Related U.S. Application Data

(60) Provisional application No. 63/146,527, filed on Feb. 5, 2021.

(51) Int. Cl.
*G06N 3/084* (2023.01)
*G06N 3/04* (2023.01)

(52) U.S. Cl.
CPC .............. *G06N 3/084* (2013.01); *G06N 3/04* (2013.01)

(58) Field of Classification Search
CPC ..................................................... G06N 3/084
See application file for complete search history.

(56) References Cited

U.S. PATENT DOCUMENTS

| 2012/0150939 A1* | 6/2012 | Zaifman | G06F 9/45512 715/744 |
| 2017/0109356 A1* | 4/2017 | Sawal | G06F 9/453 |
| 2017/0270091 A1* | 9/2017 | Singh | G06F 9/45512 |
| 2018/0053287 A1* | 2/2018 | Cheng | G06T 5/20 |
| 2020/0150985 A1 | 5/2020 | Moghaddam et al. | |

OTHER PUBLICATIONS

Kumar et al., "Natural Language Interface to Linux Shell—Report," 3rd International Conference on Computing and Communication Technologies 2019, pp. 24-30. (Year: 2019).*
"International Search Report and Written Opinion Issued in PCT Application No. PCT/US22/013034", Mailed Date: May 6, 2022, 13 Pages.
Sun, et al., "A General Fine-tuned Transfer Learning Model for Predicting Clinical Task Acrossing Diverse EHRs Datasets", In Proceedings of the IEEE International Conference on Bioinformatics and Biomedicine, Nov. 18, 2019, pp. 490-495.

(Continued)

*Primary Examiner* — Eric J. Bycer
(74) *Attorney, Agent, or Firm* — Workman Nydegger

(57) ABSTRACT

An example generator tool generates an example illustrating correct usage of a command of a command line interface. A command may include a command name, zero or more subcommands, and one or more parameters with a corresponding parameter value. A template containing the correct syntax of the command is obtained from a template database. Parameter values for the template are generated from a neural transformer with attention given the command template.

20 Claims, 7 Drawing Sheets

(56) References Cited

OTHER PUBLICATIONS

Asaduzzaman, et al., "Answering Questions about Unanswered Questions of Stack Overflow", In Proceedings of 10th Working Conference on Mining Software Repositories (MSR), May 18, 2013, pp. 97-100.
Clement, et al., "PyMT5: Multi-mode Translation of Natural Language and Python Code with Transformers", In Proceedings of the Conference on Empirical Methods in Natural Language Processing, Nov. 16, 2020, pp. 9052-9065.
Cubranic, et al., "Hipikat: Recommending Pertinent Software Development Artifacts", In Proceedings of the 25th International Conference on Software Engineering, May 3, 2003, pp. 408-418.
Dekel, et al., "Improving API Documentation Usability with Knowledge Pushing", In Proceedings of IEEE 31st International Conference on Software Engineering, May 16, 2009, pp. 320-330.
Forward, et al., "The Relevance of Software Documentation, Tools and Technologies: A Survey", In Proceedings of the 2002 ACM Symposium on Document Engineering, Nov. 8, 2002, pp. 26-33.
Gulwani, Sumit, "Automating string processing in spreadsheets using input-output examples", In Journal of ACM SIGPLAN Notices, vol. 46, Issue 1, Jan. 26, 2011, pp. 317-329.
Holmes, et al., "The end-to-end use of source code examples: An exploratory study", In Proceedings of IEEE International Conference on Software Maintenance, Sep. 20, 2009, pp. 1-8.
Holmes, et al., "Using Structural Context to Recommend Source Code Examples", In Proceedings. 27th International Conference on Software Engineering, May 15, 2005, pp. 117-125.
Kandel, et al., "Wrangler: Interactive Visual Specification of Data Transformation Scripts", In Proceedings of the SIGCHI Conference on Human Factors in Computing Systems, May 7, 2011, pp. 3363-3372.
Kim et al., "Adding examples into java documents", In IEEE/ACM International Conference on Automated Software Engineering, Nov. 16, 2009,, 5 Pages.
Ko, et al., "Six Learning Barriers in End-User Programming Systems", In Proceedings of the IEEE Symposium on Visual Languages, Human Centric Computing, Sep. 30, 2004, 8 Pages.
Lau, et al., "Programming by Demonstration Using Version Space Algebra", In Journal of Machine Learning, vol. 53, Oct. 1, 2003, pp. 111-156.
Lethbridge, et al., "How Software Engineers Use Documentation: The State of the Practice", In Journal of IEEE Software ( vol. 20 , Issue: 6), Nov. 3, 2003, pp. 35-39.
Lewis, et al., "BART: Denoising sequence-to-sequence pre-training for natural language generation, translation, and comprehension", In Proceedings of the 58th Annual Meeting of the Association for Computational Linguistics, Jul. 2020, pp. 7871-7880.
Liang, et al., "Learning Programs: A Hierarchical Bayesian Approach", In Proceedings of the 27th International Conference on Machine Learning, Jun. 21, 2010, 8 Pages.
Maaten, et al., "Visualizing Data Using t-SNE", In Journal of Machine Learning Research, vol. 9, Nov. 2008, pp. 2579-2605.
Mamykina, et al., "Design Lessons from the Fastest Q&A Site in the West", In Proceedings of the SIGCHI Conference on Human Factors in Computing Systems, May 7, 2011, pp. 2857-2866.
Mandelin, et al., "Jungloid Mining: Helping to Navigate the API Jungle", In Proceedings of the ACM Sigplan Notices, vol. 40, Issue 6, Jun. 12, 2005, 14 Pages.
Mar, et al., "Recommending proper API code examples for documentation purpose", In Proceedings of 18th Asia-Pacific Software Engineering Conference, Dec. 5, 2011, pp. 331-338.
Mclellan, et al., "Building More Usable APIs", In Journal of IEEE software, vol. 15, Issue 3, May 1998, pp. 78-86.
Miller, et al., "Interactive Simultaneous Editing of Multiple Text Regions", In Proceedings of the General USENIX Annual Technical Conference on General Track., Jun. 25, 2001, 15 Pages.
Montandon, et al., "Documenting apis with examples: Lessons learned with the apiminer platform", In Proceedings of 20th working conference on reverse engineering, Oct. 14, 2013, pp. 401-408.
Nasehi, et al., "Unit tests as API usage examples", In Proceedings of IEEE International Conference on Software Maintenance, Sep. 12, 2010, 10 Pages.
Nykaza, et al., "What programmers really want: results of a needs assessment for SDK documentation", In Proceedings of the 20st annual international conference on Documentation, Oct. 20, 2002, pp. 133-141.
Pagano, et al., "How Do Developers Blog? An Exploratory Study", In Proceedings of the 8th Working Conference on Mining Software Repositories, May 21, 2011, pp. 123-132.
Parnas, et al., "A Rational Design Process: How and Why to Fake It", In Proceedings of IEEE Transactions on Software Engineering, vol. SE-12., Issue: 2, Feb. 1986, pp. 251-257.
Parnin, et al., "Crowd Documentation: Exploring the Coverage and the Dynamics of API Discussions on Stack Overflow", In Georgia Tech Technical Report, May 2012, 11 Pages.
Parnin, et al.. "Measuring API documentation on the web", In Proceedings of the 2nd international workshop on Web 2.0 for software engineering, May 24, 2011, pp. 25-30.
Raymond, et al., "Synthesizing API usage examples", Proceedings of the 34th International Conference on Software Engineering, Jun. 2, 2012, 11 Pages.
Robillard, et al., "Recommending Reference API Documentation", In Publication of Empirical Software Engineering, vol. 20, No. 6, Dec. 1, 2015, pp. 1-28.
Robillard, Martinp., "What Makes APIs Hard to Learn? Answers from Developers", In Journal of IEEE Software. vol. 26, Issue 6, Nov. 2009, pp. 27-34.
Robins, et al., "Learning and Teaching Programming: A Review and Discussion", In Journal of Computer Science Education, vol. 13, No. 2. Jun. 1, 2003, pp. 137-172.
Sahavechaphan, et al., "XSnippet; Mining for Sample Code", In Proceedings of the 21st Annual ACM SIGPLAN Conference on Object-Oriented Programming Systems, Languages, and Applications, Oct. 16, 2006, pp. 413-430.
Vaswani, et al., "Attention is All You Need", In Proceedings of 31st Conference on Neural Information Processing Systems, Dec. 4, 2017, 11 Pages.
Zhu, et al., "Mining api usage examples from test code", In Proceedings of IEEE International Conference on Software Maintenance and Evolution, Sep. 1, 2014, pp. 301-310.

\* cited by examiner

NEURAL COMMAND LINE INTERFACE EXAMPLE GENERATION

CROSS-REFERENCE TO RELATED APPLICATIONS

The present application claims the benefit of the earlier filed provisional application having Ser. No. 63/146,527 filed on Feb. 5, 2021, the entirety of which is hereby incorporated by reference.

BACKGROUND

A command line interface is a user interface in which a user enters commands in the form of a string of text characters. The command line interface is a text-based interface in which the commands are manually typed. The command line interface accepts commands in a designated input field which are then executed by a command line interpreter. This type of user interface is advantageous over a graphical user interface (GUI) where a user uses a mouse or fingers to click images of icons to access files or programs and/or to execute various operations. The command line interface is faster and more efficient than a GUI since it is composable, that is several tasks can be specified in a single text string thereby eliminating numerous interactions with the GUI.

The use of a command line interface requires a user to be familiar with the commands supported by the command line interface and the correct syntax of the commands. The availability of good reference documentation for the commands may be limited or outdated. This is often a problem where there are a large number of commands with various sub-commands and parameters which may be used in numerous ways.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An example generation tool responds to requests for the correct usage of a CLI command by generating an example. The tool searches for a template matching the command from a template database. The template contains a pattern showing correct usage of the command including the command, zero or more subcommands, and one or more parameters. The templates are constructed from sources where the parameter values are incorrect or missing. The tool uses a neural transformer model with attention to predict at most k candidate parameter values for each parameter in a template. A command validator analyzes each of the k candidate parameter values for syntax and data format correctness to select one of the k candidate parameter values that fits best in the example.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
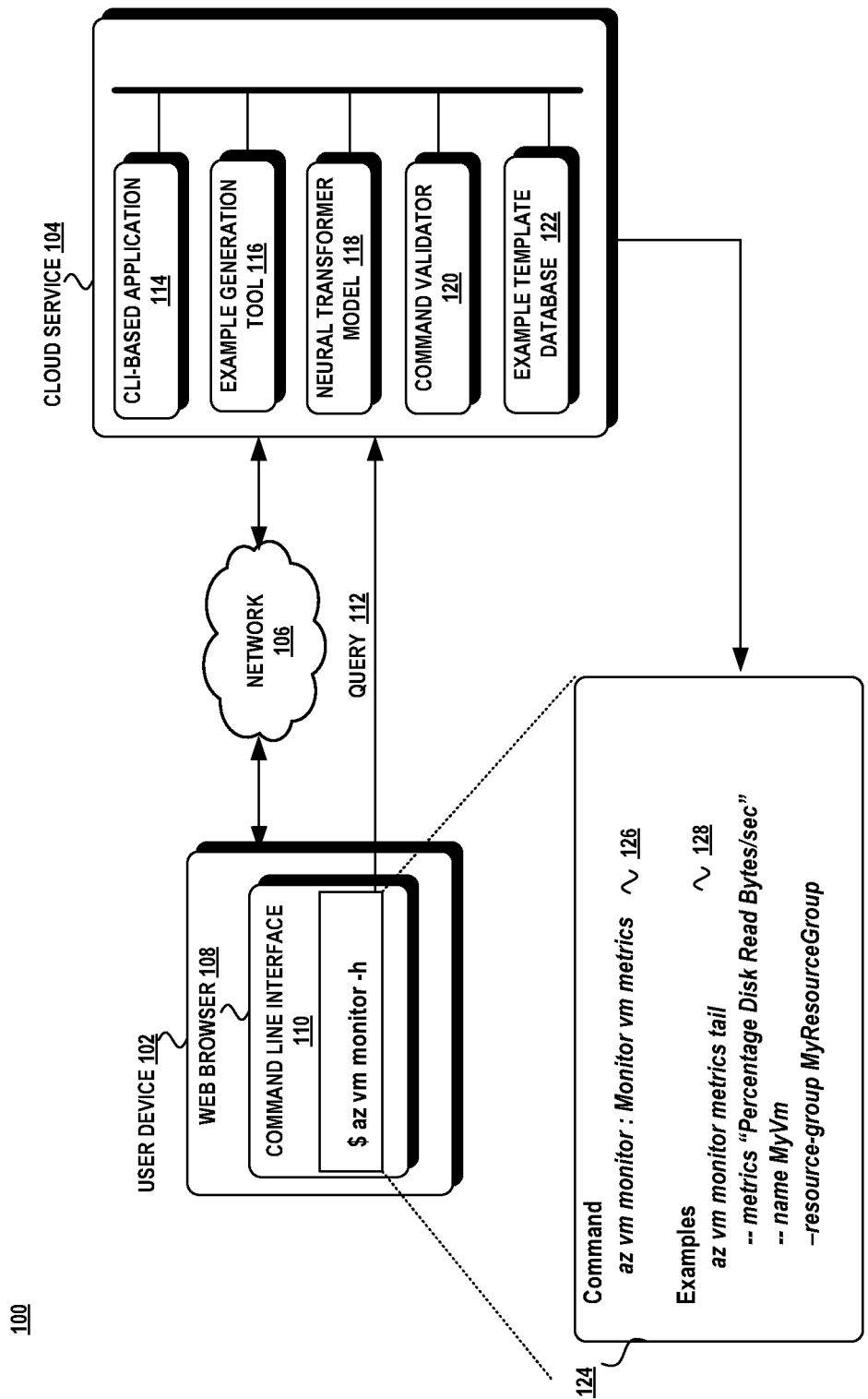
FIG. 1 illustrates an example of a system for neural command line interface example generation.

The subject matter disclosed herein pertains to an example generation tool for a browser-enabled command line interface of a cloud service. The tool provides examples illustrating the correct syntax for a command used to manage resources of a cloud service. A command includes subcommands, parameters, and parameter values which adhere to a specific syntax in order to be executed. The example generation tool provides a fast and convenient means to obtain examples illustrating the correct usage especially when there is limited or stale documentation. A cloud service may have a vast number of commands with numerous subcommands, parameters, and parameter values making it difficult for a user to remember the correct syntax needed to perform a function.

The tool uses templates having usage patterns of a command in combination with different subcommands, and/or parameters. The patterns come from publicly-accessible shell script programs that use the commands, such as, telemetric data and user documentation. There may be multiple templates for a command where each template has a different combination of subcommands, parameters and/or parameter values. A template also includes a description of the command obtained from publicly-accessible sources. Often the sources of the templates do not contain parameter values. The telemetric data does not contain parameter values since those values may contain personal or private data which is eliminated from the telemetric data. Examples from other publicly-accessible sources may be incomplete and not contain parameter values.

In order to provide useful examples, a neural transformer model with attention is used to predict the correct parameter value of a parameter of a command. The neural transformer model with attention is one distinct type of machine learning model. Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The attention mechanism provides the model with a better capability to learn the task at hand thereby generating more accurate predictions of a parameter value.

Attention now turns to a further discussion of the system, devices, components, and methods utilized in neural CLI command example generation.

Neural CLI Command Example Generation System

FIG. 1 illustrates a block diagram of an exemplary system 100 in which various aspects of the invention may be practiced. As shown in FIG. 1, system 100 includes a user device 102 communicatively coupled to a cloud service 104 through a network 106. The user device 102 includes a web browser 108 hosting a command line interface 110. The cloud service 104 includes a CLI-based application 114, an example generation tool 116, a neural transformer model 118, a command validator 120, and an example template database 122.

The CLI 110 is used to perform CLI commands for various CLI-based applications, such as deployment of one or more processing components for a computing environment. The CLI-based application 114 requires CLI commands entered to perform desired computer operations. The CLI 110 may be a shell program that is executed through a web browser or rich client application 108.

The CLI 110 enables a user of the user device 102 to access resources on the cloud service through text-based commands. In one aspect, commands are entered into a command prompt or input field of the CLI and transformed into Representational State Transfer (REST) Application Programming Interfaces (APIs). The REST APIs are service endpoints that support a set of HTTP operations or methods to create, retrieve, update, delete or access resources on the cloud service.

CLI commands can vary in complexity depending on their usage and the parameters required to execute the CLI commands Some CLI commands may require one or more input parameters which may be derived from the output of previously-executed commands A CLI command includes a command name, zero or more sub-commands, and/or parameters or arguments. A parameter has zero or more parameter values.

An example of a CLI is the Azure® command line interface for the Microsoft® Azure® cloud computing service. This cloud computing service provides various services, such as software-as-a-service (SaaS), platform-as-a-service (PaaS), and infrastructure-as-a-service (IaaS) to build, test, deploy, and manage services and applications in addition to providing different programming tools. It should be noted that the techniques described herein are not limited to this particular CLI or to a particular configuration of a CLI interface.

In order to perform an operation in the CLI-based application 114, a user would need to know what CLI command to use, the correct format of the command, the parameters needed for the command, and the associated parameter values. The correct usage of a CLI command refers to the format of the text string of an operation that includes the command, subcommands, parameters and/or parameter values needed to execute the operation. If a required parameter is not entered with the correct parameter value, execution of the command would likely cause an error. The user would have to find the correct usage of the command and correct the error. This process would have to be repeated for each error encountered with a CLI command until every error is corrected.

In order to assist the user in knowing the correct format for a command, the user may seek assistance from the CLI-based application. As shown in FIG. 1, a user may issue the command az vm monitor -h. The az vm monitor command is used to monitor the metrics of a virtual machine. The command is az vm and monitor is a subcommand. The parameter -h is a request for help with the command. The command is sent to the cloud service 104 which has an example generation tool 116. The example generation tool 116 generates an example 124 based on the query 112 which is returned back to the user device 102. As shown in FIG. 1, the example 124 consists of a description of the command 126 and an example of the correct usage 128.

As shown in example 128, the string az vm monitor metrics tail is returned since it is the most commonly-used command string used for az vm monitor. The string metrics tail is the subcommand. In this example, the subcommand metrics tail has multiple parameters with parameter values shown in example 128. The string -metrics "Percentage Disk Read Bytes/sec" represents the parameter metrics with the parameter value "Percentage Disk Read Bytes/sec", the string -name MyVm represents the parameter name with the parameter value MyVm and the string -resource-group MyResourceGroup represents the parameter resource-group with the parameter value MyResourceGroup.

The example generation tool 116 receives the query 112, az vm monitor -h, and obtains a template from the example template database 122 matching the command. The example template database 122 includes a number of templates for each command A template contains a command, subcommand and/or parameters. There may be multiple templates for a command where each template has a unique combination of subcommands, parameters and/or parameter values. The example generation tool 116 selects the template closely matching the query 112.

The example generation tool 116 uses the neural transformer model 118 to predict one or more parameter values given a template with parameters and no parameter values. The neural transformer model 118 generates a probability for each predicted parameter value indicating the likelihood of the parameter value being associated with the parameter in the given context. There may be several predicted parameters values for a parameter. The command validator 120 checks the data type of each predicted parameter value and selects one of the predicted parameter values having a data type consistent with the template and a highest probability.

Attention now turns to a description of the neural transformer model with attention.

Neural Transformer Model Architecture

Figure 2:
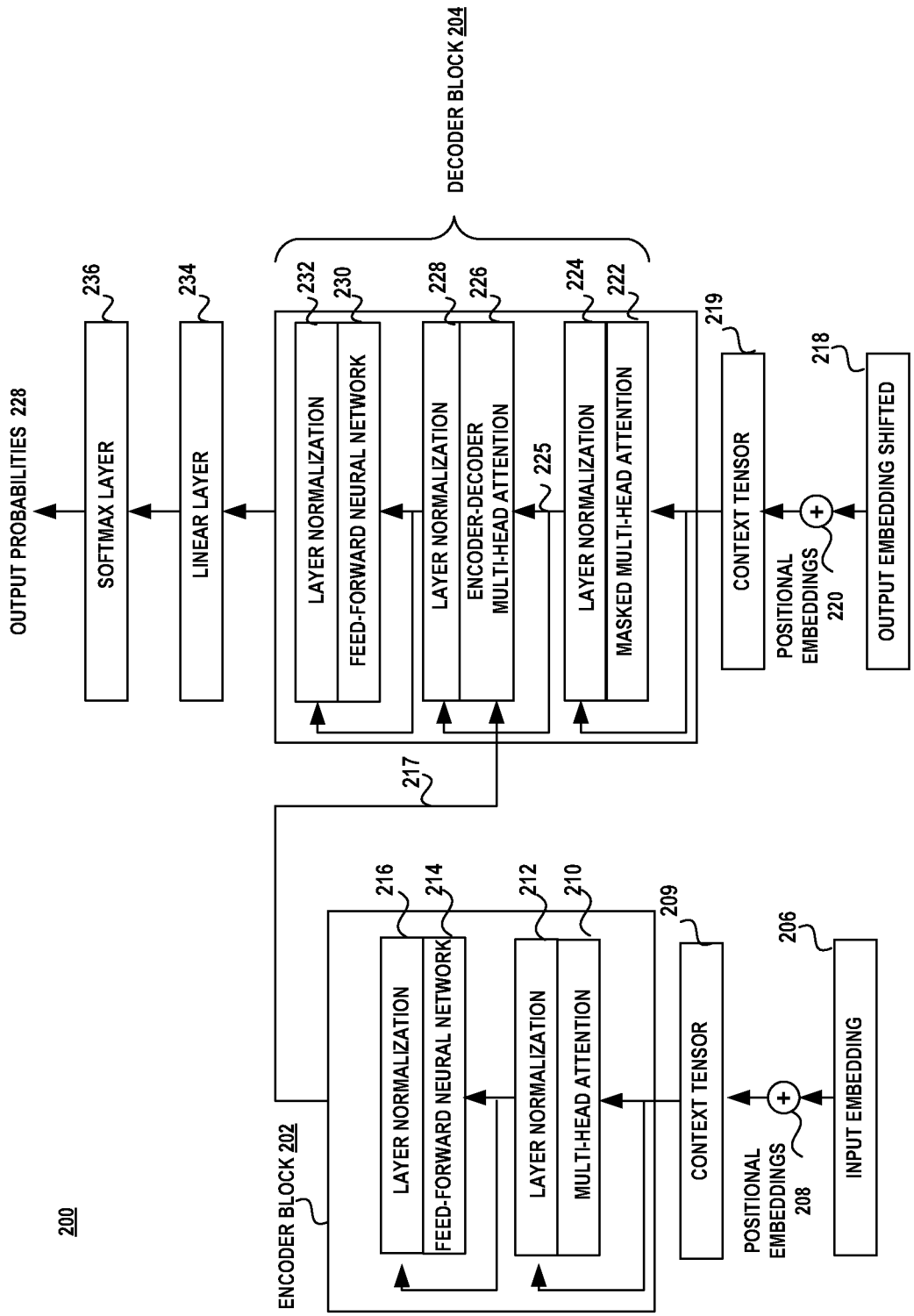
FIG. 2 is a schematic diagram illustrating an example of an architecture of a neural transformer model based on encoder and decoder blocks with attention.

FIG. 2 shows an example of a structure of the neural transformer model with attention. The neural transformer model 200 contains one or more encoder blocks 202 and one or more decoder blocks 204. The initial inputs to an encoder block 202 are the input embeddings 206 of an input sequence of the training dataset. In order to retain the order of the subtokens in the input sequence, positional embeddings 208 are added to the input embedding 206 forming a context tensor 209. The initial inputs to the decoder block 204 are a shifted sequence of the output embeddings 218 to which the positional embeddings 220 are added forming context tensor 219.

An encoder block 202 consists of two layers. The first layer includes a multi-head attention component 210 followed by layer normalization component 212. The second layer includes a feed-forward neural network 214 followed by a layer normalization component 216. The context tensor 209 is input into the multi-head attention layer 210 of the encoder block 202 with a residual connection to layer normalization 212. The output of the layer normalization 212 is input to the feed forward neural network 214 with another residual connection to layer normalization 216. The output of the encoder block 202 is a set of hidden representations 217. The set of hidden representations 217 is then sent through additional encoder blocks, if multiple encoder blocks exist, or to the decoder 204.

Attention is used to decide which parts of the input sequence are important for each subtoken, especially when decoding long sequences since the encoder is limited to encoding a fixed-size vector. Attention mechanisms gather information about the relevant context of a given subtoken and then encode that context into a vector which represents the subtoken. It is used to identify the relationships between subtokens in the long sequence while ignoring other subtokens that do not have much bearing on a given prediction.

The multi-head attention component 210 takes a context tensor 209 and weighs the relevance of each subtoken represented in the context tensor to each other by generating attention weights for each subtoken in the input embedding 206. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one subtoken in a sequence, K is the vector representations of all subtokens in the sequence, and V is the vector representations of all the subtokens in the sequence.

The queries, keys and values are linearly projected h times in parallel with $d_v$ output values which are concatenated to a final value:

$$\text{MultiHead}(Q,K,V) = \text{Concat}(\text{head}_1, \ldots, \text{head}_h)W^O,$$

where $\text{head}_i = \text{Attention}(QW_i^Q, KW_i^K, VW_i^V)$, with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural transformer, layer normalization is used between the layers. The layer normalization component normalizes the inputs across the features. The mean and standard deviation is computed across the feature dimensions. There is a first layer normalization 212 that precedes the feed forward neural network 214 and a second layer normalization 216 that follows the feed forward neural network 214.

The feed-forward neural network 214 processes each output encoding separately 213. The output of the top encoder block is a set of attention vectors K and V 217 which is used by the encoder-decoder multi-head attention layer 226 of the decoder block 204.

The decoder block 204 predicts each subtoken $t_i$ in the target language one-by-one at each time step conditioned on all previously-generated target subtokens $t_1, \ldots, t_{i-1}$. The decoder block 204 consists of three layers. The first layer includes a masked multi-head attention component 222 followed by a layer normalization component 224. The output of the layer normalization component 224 is input into the encoder-decoder multi-head attention component 226 with a residual connection to layer normalization component 228. The second layer includes an encoder-decoder multi-head attention component 226 followed by a layer normalization component 228. The output of layer normalization component 228 is input into the feed forward neural network 230 with a residual connection to layer normalization component 232. The third layer includes a feed forward neural network 230 followed by a layer normalization component 232.

The masked multi-head attention component 222 receives the output embeddings of the previous timestep. The masked multi-head attention component 222 masks the output embeddings from future time steps. The encoder-decoder multi-head attention layer 226 receives queries from the previous decoder layer 225 and the memory keys and values 217 from the output of the encoder block 202. In this manner, the decoder block 204 can attend to every position of the input sequence. The feed-forward neural network 230 processes each output encoding separately. A layer normalization component 224, 228, 232 is used between the layers in order to normalizes the inputs across the features.

The linear layer 234 projects the vector produced by the stack of decoders into a logits vector. The softmax layer 236 then turns the scores of the logits vector into probabilities for each subtoken in the vocabulary which are positive and normalized.

In one aspect, the neural transformer model contains a stack of six encoder blocks and a stack of six decoder blocks which are aggregated into a neural transformer block. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

Attention now turns to description of the various examples of methods that utilize the system and device disclosed herein. Operations for the aspects may be further described with reference to various examples of the methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Neural Transformer Training

Figure 3:
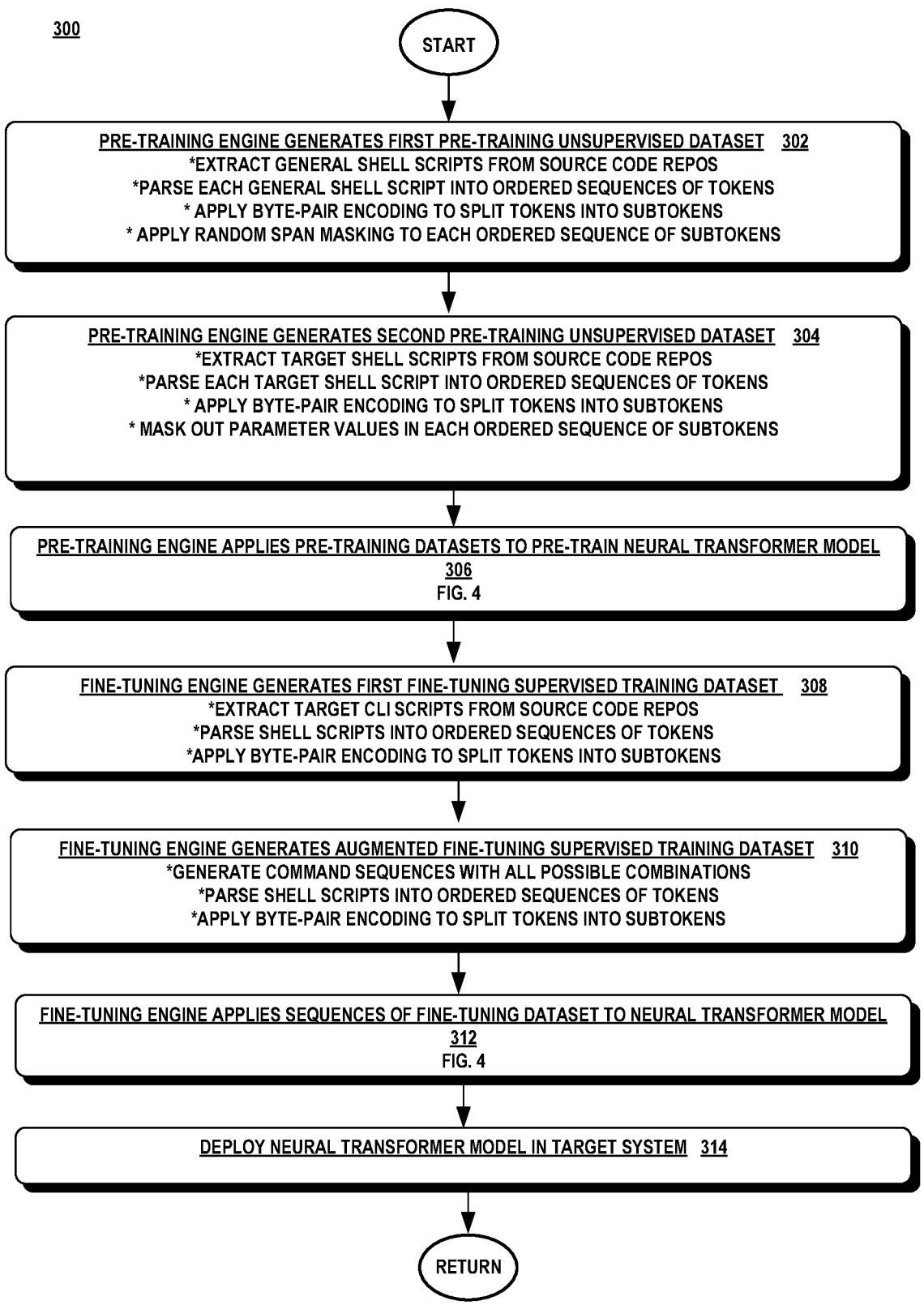
FIG. 3 is a flow diagram illustrating an example of a method for training the neural transformer model and deploying the neural transformer model in a target system.

FIG. 3 an example of a method 300 for training the neural transformer model. In one aspect, the neural transformer model is trained through transfer learning. Transfer learning is a methodology of training models by pre-training the model using unsupervised learning on unlabeled data to learn generalized knowledge and then fine-tuning the model for translation tasks via supervised learning.

In one aspect, the model is pre-trained on two different pre-training training datasets. The first pre-training dataset is derived from various CLI shell scripts with a random span masking objective. The random span masking objective replaces random spans of tokens with a <MASK> token so the model is trained to predict the tokens replaced by the mask token. The second pre-training dataset is derived from shell scripts of a target CLI, such as Azure® CLI scripts, where the input sequences have masked parameter values. The parameter values are replaced with a <MASK> token and the model is trained to predict the parameter values replaced by the mask.

The model is then fine-tuned with two different fine-tuning training datasets. The first fine-tuning training dataset is derived from the target CLI shell scripts and includes ordered sequences of commands with parameters and associated parameter values.

one aspect, the target CLI is Azure® CLI which includes named parameters. A named parameter is preceded by a double-dash character string, such as "--Resource Group" and followed by its parameter value. The model is trained to learn to predict the parameter values of named parameters.

The first fine-tuning training dataset is not large by modern deep learning standards so in order to improve the model training, an augmented training dataset is generated. The augmented training dataset consists of all permutations of a command with various combinations of the parameters with masked and unmasked parameter values. In this manner, the model is trained with more examples of the different combinations of a command, subcommand, parameters, and/or parameter values. This is useful for the model to learn the number of parameters associated with a particular command/subcommand combination.

The model is also trained to perform partial and conditional parameter prediction, where one or more parameter values are already known. Since the training samples are correct, this is considered a supervised training dataset. The augmented training dataset may include the command "az create vm --name <MASK> --ResourceGroup <MASK>", where the masks replaced the parameter values "MyVM" and "MyResourceGroup", respectively. The augmented training dataset will include additional copies of this command with each of the masks containing the correct parameter value resulting in two additional augmented training samples: "az create vm --name <MyVM> --ResourceGroup <MASK>" and "az create vm --name <MASK> --Resource-Group <MyResourceGroup>". In general, for a command with N parameters the augmentation will yield $2^N-1$ augmented training samples.

Turning to FIG. 3, a pre-training engine generates the first pre-training dataset. The first pre-training dataset is an unsupervised training dataset generated from extracting command sequences from CLI shell scripts from one or more source code repositories. The CLI shell scripts include commands of command line interfaces, other than the target CLI. A command sequence includes a command name, zero or more subcommands, zero or more parameters with associated parameter values. A shell is a command line interpreter for a shell programming language. A shell script is a file including shell commands of a particular shell programming language. There are various types of shell scripts, such as *.sh (Unix/Linux executable shell file), *.bash (Bourne Again SHell executable shell file), and *.zsh. Any and all of these shell scripts are used to generate the first pre-training dataset. (Collectively, block 302)

A source code repository is a file archive and web hosting facility that stores large amounts of source code either privately or publicly. A source code repository can be structured as a version control system, such as GIT, Mer- curial, etc. The files residing in the source code repository vary and include script files, source code files, test cases, and the like.

The pre-training engine transforms each of the selected shell script files into a concrete syntax tree. The concrete syntax tree represents the source code text in the parsed form. A concrete syntax tree represents the syntactic structure of a program in a hierarchical or tree structure. The concrete syntax tree is an n-ary tree data structure that includes nodes that represent a construct in the grammar of the programming language of a program. The concrete syntax tree includes one root node, multiple internal nodes, and multiple terminal nodes. The terminal nodes represent the tokens. A token is a symbol that represents an operand or an operator. The concrete syntax tree differs from an abstract syntax tree where the terminal nodes represent operands. (Collectively, block 302).

The pre-training engine uses a tokenizer to extract tokens from the concrete syntax tree. The frequently-used elements in a programming language are encoded into tokens and the less frequently-occurring elements are encoded into combinations of characters referred to as subtokens. For simplicity, the term subtoken shall include tokens and subtokens. (Collectively, block 302).

The pre-training engine uses a byte-level byte-pair extraction algorithm to generate T-ordered sequences of subtokens, where T is the maximum context length. Byte-level byte-pair encoding (BPE) is used to generate the vocabulary used by the neural transformer model. A text string, either a sequence of source code or a natural language text, is represented as a sequence of Unicode Transform Format, UTF-8 bytes. The input text string of subtokens is encoded as a sequence of UTF-8 bytes, where a subtoken is encoded into one to four bytes. A byte sequence is then partitioned into byte-level subwords, referred to as byte n-grams. (Collectively, block 302).

The byte-level subwords are generated using the BPE algorithm, which extracts the k most frequently-occurring n-grams. The result is a vocabulary size of the k most frequently-occurring n-grams. An n-gram is a contiguous sequence of n subtokens from an input text string of either source code or natural language text. This type of encoding does not rely on knowing the underlying language making it suitable for an input sequence of text strings that contain source code or natural language text. The ordered sequences of UTF-8 bytes are translated into a T-ordered sequence of subtokens which are vector representations of a source code fragment or natural language text. (Collectively, block 302).

A denoising function, such as a span masking function, is then applied to each sequence that randomly masks out a subset of subtokens and the masked span of subtokens is replaced with a mask subtoken, <MASK>. The model is trained with the masked sequences to learn to reconstruct the original sequence without the masked subtokens. In one aspect, the mask subtoken replaces a span of subtokens. The number of spans and the span lengths are randomly generated and each span is replaced with a single mask subtoken. The masked denoising is based on the doze task of evaluating human language-learners' proficiency, in which humans are given a foreign language with missing words, and are asked to correctly choose the missing word. The benefit of span-masking denoising in pre-training is that the model learns the desired language in an unsupervised fashion, but also is bi-directional in the sense that it learns the relationships of words both before and after their occurrence. (Collectively, block 302).

The pre-training engine generates the second pre-training dataset from shell scripts of the target CLI in one or more source code repositories. Each shell script is parsed into a concrete syntax tree and tokenized into an ordered sequence of tokens. BPE is used to split the tokens into subtokens. The parameter values of each ordered sequence of subtokens are masked out with a mask token. (Collectively, block 304).

Figure 4:
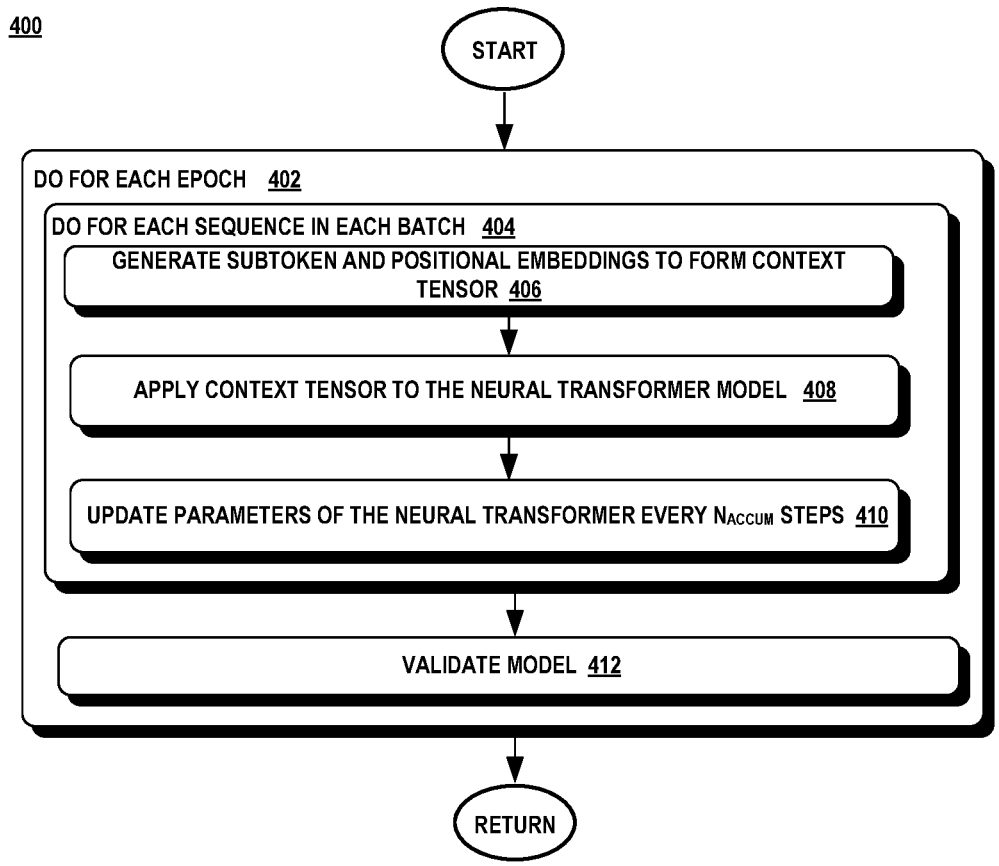
FIG. 4 is a flow diagram illustrating an example of a method for applying input sequences to train the neural transformer with attention.

The pre-training datasets are then applied to the neural transformer model (block 306). Turning to FIG. 4, there is shown an example of a process 400 for training the neural transformer model with the pre-training dataset.

Neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 402, 404).

The neural transformer model has multiple blocks and layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned.

In one aspect, the hyperparameters may include the following: (1) subtoken and position embedding layers of dimensions: 30000×768, and 1024×768 respectively; (2) the configuration of the neural transformer model with six encoder blocks and six decoder blocks; (3) for the training procedure: denoising auto-encoder, with a cross-entropy loss optimization objective; the sequence length of 1024 symbols; a mini-batch size of 8; the gradient accumulation steps for each weight update is 8; the Adam stochastic optimization procedure is used to train the feed forward neural network; and the learning rate is 0.0001.

For each sequence of each batch in each epoch (blocks 402, 404), the T-ordered sequences of subtokens are then mapped into numeric vectors and then into respective subtoken embeddings and positional embeddings (block 406). An embedding is a learned representation for the text-based subtokens where subtokens that have a common meaning have a common representation. An embedding is a mapping of discrete categorical variables to a vector of continuous numbers. There is an embedding for each subtoken in the vocabulary and a corresponding positional embedding. The subtoken embedding represents the learned representation for the subtoken. The neural transformer model does not read each subtoken sequentially and as such, has no knowledge of the subtoken's position in a sequence without additional position information. The positional embedding is used to embed position information about a subtoken's position in a sequence into the neural transformer model.

Initial values are generated for the subtoken embedding and positional embeddings of each sequence which are then used to form a context tensor. Thereafter, the neural transformer model learns the values for each embedding. Upon the completion of the training phase, the embeddings for each subtoken and the positional embeddings are saved into respective matrices for later use. There is a subtoken embedding matrix, We, that contains an embedding vector for each subtoken $t_i$, $i=0 \ldots V$, and a positional embedding matrix, $W_P$, that contains an embedding vector $P_j$, $j=0 \ldots T$, for each position, where V is the size of the vocabulary and T is the length of the subtoken sequence. (Collectively, block 406).

The first encoder block of the neural transformer model takes the context tensor as input and passes it through the multiple layers of multi-head attention, layer normalization and feed-forward neural network to finally produce a set of hidden representations If there are additional encoder blocks, the output of each encoder block is passed onto the next encoder block with the output of the last encoder block producing the set of hidden representations. The set of hidden representations is passed onto each decoder block. (Collectively, block 408).

The decoder blocks of the neural transformer model take a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T. Starting with the first token of the output sequence, the subtokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 408).

The feed forward neural networks in the encoder blocks and the decoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 408).

At the completion of each batch, the parameters of the neural transformer model are updated at a preconfigured frequency denoted as Naccum. Naccum is a gradient accumulation frequency and in one aspect has a value of 8. The parameters include the subtoken embeddings and the positional embeddings which are stored in a respective embedding matrix. (Collectively, block 410).

Next, the neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 412).

Turning back to FIG. 3, a fine-tuning engine generates the first fine-tuning training dataset from one or more source code repositories having shell scripts of a target CLI. In one aspect, the fine-tuning dataset is extracted from source code repositories having Azure® CLI shell scripts. A concrete syntax tree is generated from parsing each shell script of the target CLI from which a tokenizer extracts an ordered sequence of tokens which are then split into subtokens through byte-pair encoding (Collectively, block 308).

The fine-tuning engine generates a second fine-tuning training dataset which consists of data-augmented training sequences. A training sequence includes all permutations of a command with its associated subcommands, parameters, and parameter values. For example, given a command with two parameters would yield three training sequences. The first training sequence consists of the command with both parameters and their respective parameter values masked out. The second training sequence consists of the command with the first parameter and its respective parameter value with the second parameter masked out. The third training sequence consists of the command with the first parameter masked out with the second parameter and its associated parameter value. (Collectively, block 310).

Each of these training sequences is then transformed into an ordered sequence of subtokens. The training sequences are parsed into a concrete parse tree and tokenized into a sequence of tokens. BPE is used to split the tokens into subtokens and generating a sequence of subtokens. (Collectively, block 310).

The fine-tuning engine applies the fine-tuning training datasets in a similar method as shown above with respect to FIG. 4 (block 312). Upon completion of the training, the model is then deployed in a target system (block 314).

Attention now turns to discussion of the use of the neural transformer model in the example generation tool.

Prediction of Parameter Values

The neural transformer model generates at most k predicted parameter values for a parameter value. The decoder's computation at training time can be parallelized using masked self-attention but during inference or the prediction phase, the subtokens are generated one token at a time. The neural transformer model factorizes the probability of the target subtokens in an input sequence into a product of conditional probabilities for each subtoken $t_i$ using the formula: $p(t_1, \ldots t_m|s) = \Pi_{i=1}^{m} p(t_i|t_1, \ldots, t_{i-1}, s)$, where s is the partially-formed sequence of a parameter value. The calculation of $\arg\max_t p(t|s)$ is complex and extremely time consuming making the model useless for real-time applications. Beam search is an approximation algorithm that performs faster.

The beam search uses the probability distribution generated by the neural transformer model to identify the top k subtokens likely to be the next subtoken in a candidate parameter value. The beam search expands the search by instantiating new partial candidates using each of the selected subtokens identified by the neural transformer model's probability distribution. The search continues generating new partial sequences from the top k subtokens identified by the output distributions from the neural transformer model until the search ends. The search may end when the end-of-sentence value subtoken appears as the most probable next subtoken.

A beam search uses a breadth-first search to build a search tree. The search tree is composed of nodes at one or more inference levels. Each node represents a probability distribution generated by the neural transformer model for the subtokens in the model vocabulary. At each level, only the top k subtokens having the highest probabilities from the output distribution generated by the neural transformer model are expanded to the next inference level. The variable k is preconfigured and referred to as the beam width. Each of the k subtokens is then expanded into a search that updates the current context sequence with the selected subtoken to input into the neural transformer model to generate an additional probability distribution for the next subtoken in a sequence. This process is repeated until the end-of-sentence token is predicted as being the next likely subtoken candidate.

Figure 5:
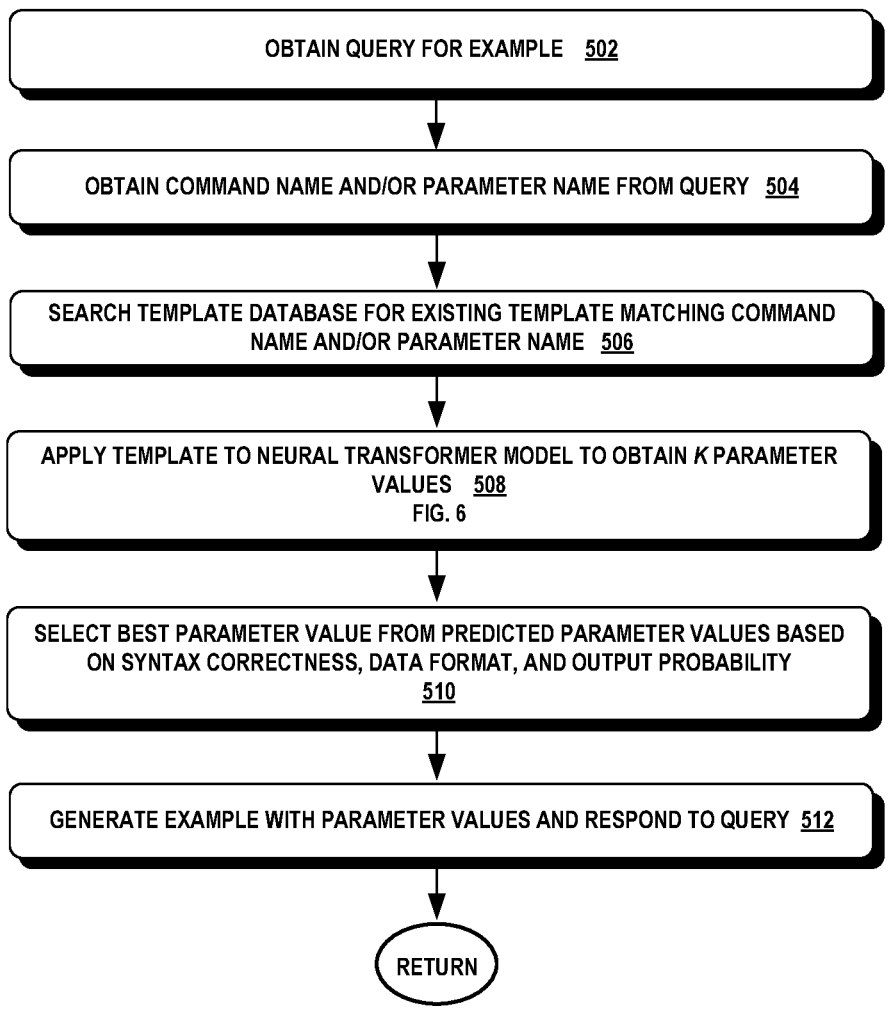
FIG. 5 is a flow diagram illustrating an example of a method for generating an example with parameter values.

Turning to FIG. 5, there is shown an example of a method 500 for predicting a parameter value using the neural transformer model. The example generation tool 116 receives a query for an example of the usage of a CLI command (block 502). The query contains a command name and optionally, a subcommand and/or parameters. The command is one that uses parameters with parameter values (block 502). The example generation tool 116 extracts the command name and any parameters in the query (block 504) to search for a template in the example template database (block 506). The template contains a command name and optionally one or more subcommands with one or more parameters (block 506). The template is input into the neural transformer model (block 508).

Figure 6:
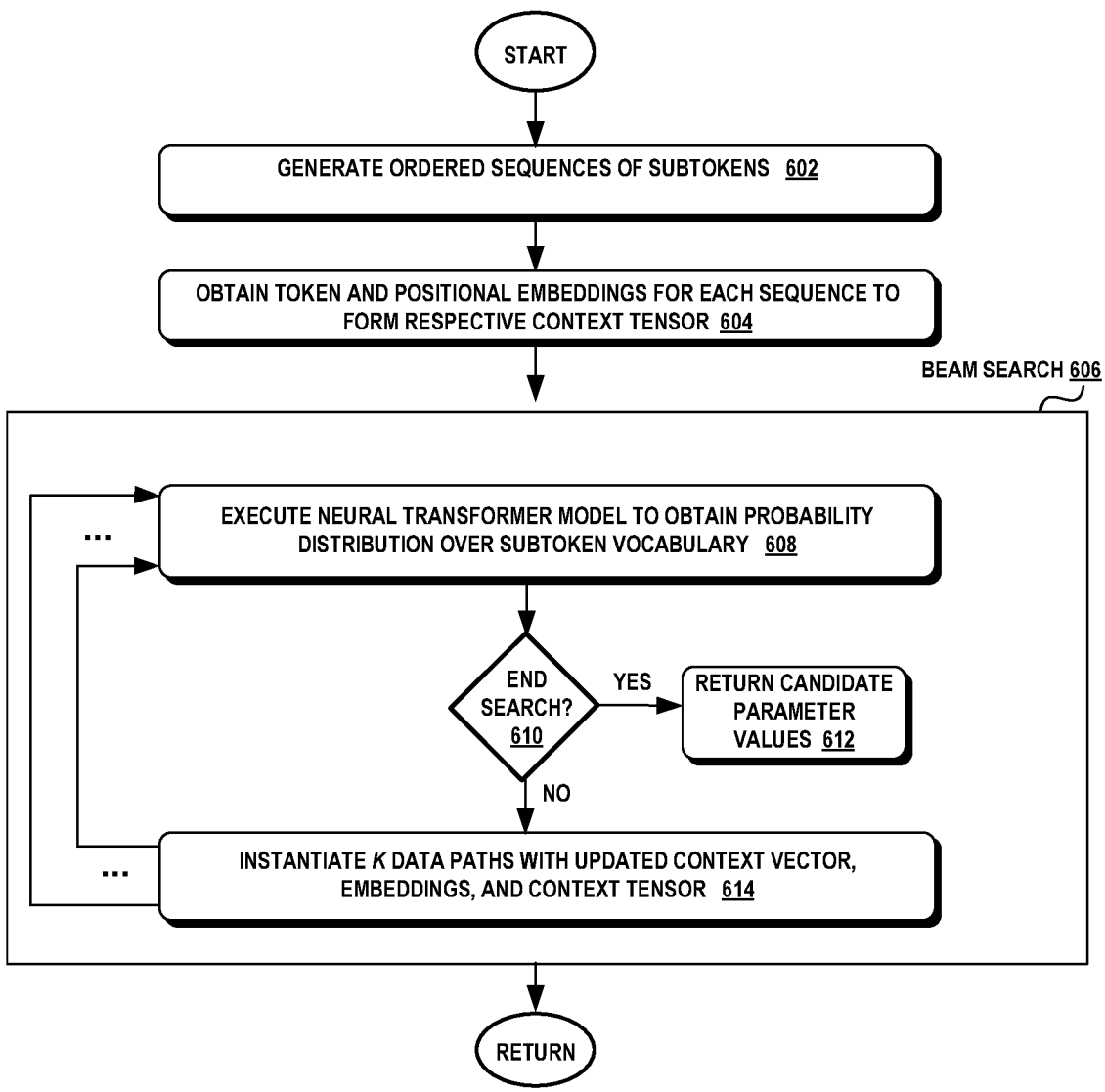
FIG. 6 is a flow diagram illustrating an example of a method for using the neural transformer model within a beam search to generate parameter values for a given template.

Turning now to FIG. 6, there is shown an example of a process for utilizing the neural transformer model to predict parameter values for the parameters in a template. The example found in the template is transformed into a vectorized sequence of subtokens. The template is parsed into a concrete syntax tree and traversed, by a tokenizer, to extract tokens in an ordered sequence. The tokens are split into subtokens by the BPE encoder to generate ordered sequences of subtokens. (Collectively, blocks 508, 602).

Each ordered sequence of T subtokens is then vectorized into a context tensor using the subtoken and positional embedding matrices learned during the training phase of the neural transformer model (block 604).

The beam search 606 uses the context tensor to initiate a prediction process using the probability distribution generated from the neural transformer model, $P_0 \ldots P_{|V|}$ (block 608). If the next subtoken sampled from probability distribution indicates that an end-of-sentence-value token is the next subtoken to follow in a partial parameter value sequence (block 610—yes), then that sequence of parameter predictions is complete.

Otherwise, the beam search 606 takes the top k states or subtokens identified from the probability distribution generated by the neural transformer model (block 616). A new context vector is generated for each of the k states, $c_1, c_k$, using the new subtoken in the context vector. The context vector utilizes the selected subtoken in the current context vector with the last subtoken removed. The new context vector will consist of T subtokens with the selected subtoken $t_k$ added to the beginning of the sequence with the last subtoken removed from the sequence. If the current context vector consists of a subtoken sequence consisting of $t_0, t_1, \ldots, t_T$, then the new context vector will consist of $t_k, t_0, t_1, \ldots, t_{T-1}$. (Collectively, block 616).

The new context vectors are then input into the prediction process (blocks 616, 608, 610, 612, 614). The beam search 606 ends when the end-of-sentence token is sampled from the candidate subtokens to complete a partial parameter value sequence. When the beam search ends (block 610—yes), the k predicted candidate parameter values are returned (block 612).

Turning back to FIG. 5, the k predicted candidate parameter values are then analyzed to select the best parameter value for the proposed example. The neural transformer model returns at most k candidate parameter values for a parameter. The command validator checks each candidate parameter value for syntax correctness and for the correct data format of a parameter value. An example is constructed with the command, any subcommands, parameter and its candidate parameter value and checked for syntax correctness by the command validator. The data format of the candidate parameter value is analyzed to ensure that the parameter value is of the correct data type for the example. For example, if an IP address is expected as a parameter value, the command validator checks if the candidate parameter value is of the form for an IP address. Those parameter values not meeting the correct syntax usage of the command or not being of the correct data format are eliminated from the set of k candidate parameter values. The candidate parameter value having the highest probability generated from the neural transformer model from the remaining candidate parameter values is selected as the best parameter value. (Collectively, block 510).

The example generation tool generates an example using the data from the template and the best parameter value for each parameter which is then returned to the user device (block 512).

Example of an Operating Environment

Figure 7:
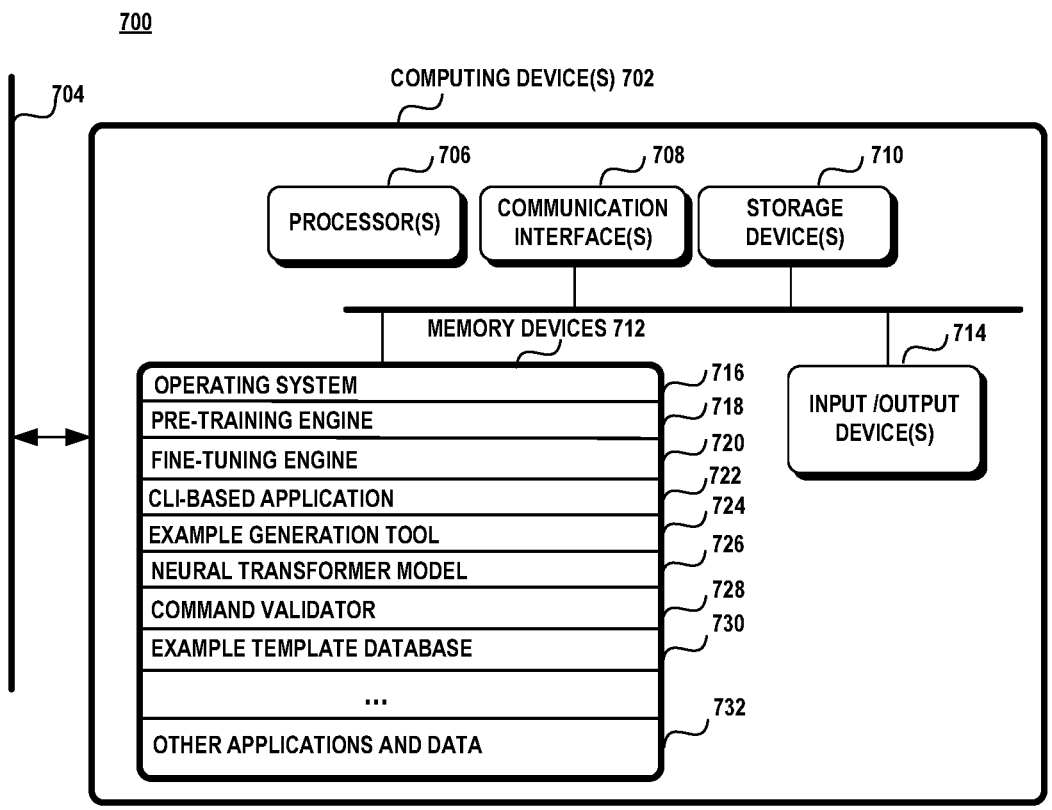
FIG. 7 is a block diagram illustrating an operating environment.

Attention now turns to a discussion of an example of an operating environment. FIG. 7 illustrates an example of the operating environment 700 in which one or more computing devices 702 are used to train the neural transformer model. However, it should be noted that the aspects disclosed herein is not constrained to any particular configuration of devices. The computing devices 702 may be configured as a cloud service. It should be noted that the operating environment is not limited to any particular configuration and other configurations are possible.

A computing device 702 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 700 may be configured in a network environment, a distributed environment, a multi-processor environment, or a stand-alone computing device having access to remote or local storage devices.

A computing device 702 may include one or more processors 706, one or more communication interfaces 708, one or more storage devices 710, one or more input/output devices 714, and one or more memory devices 712. A processor 706 may be any commercially available or customized processor and may include dual microprocessors and multi-processor architectures. A communication interface 708 facilitates wired or wireless communications between the computing device 702 and other devices. A storage device 710 may be computer-readable medium that does not contain propagating signals, such as modulated data signals transmitted through a carrier wave. Examples of a storage device 710 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 710 in the computing devices 702. The input/output devices 714 may include a keyboard, mouse, pen, voice input device, touch input device, display, speakers, printers, etc., and any combination thereof.

A memory device or memory 712 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 712 may also include one or more external storage devices or remotely located storage devices that do not pertain to propagated signals, such as modulated data signals transmitted through a carrier wave.

The memory device 712 of the computing device 702 may include an operating system 716, a pre-training engine 718, a fine-tuning engine 720, a CLI-based application 722, an example generation tool 724, a neural transformer model 726, a command validator 728, an example template database 730, and other applications and data 732.

The computing device 702 may be communicatively coupled via a network 704. The network 704 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 704 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed comprising: one or more processors; and a memory that stores one or more programs that are configured to be executed by the one or more processors. The one or more programs including instructions to perform acts that: obtain a first pre-training dataset, the first pre-training dataset including a plurality of commands of a first command line interface (CLI), a command including a command name and at least one parameter having a parameter value; pre-train a deep learning model with the first pre-training dataset; obtain a first fine-tuning dataset, the first fine-tuning dataset including a plurality of command sequences of a second CLI, a command sequence of the second CLI including a command name and a parameter with a corresponding parameter value, the first CLI differs from the second CLI; and fine-tune the deep learning model with the first fine-tuning dataset, wherein the deep learning model is trained to predict a parameter value of a parameter associated with a given command of the second CLI.

In an aspect, pre-train the deep learning model with the first pre-training dataset further comprises: generate an ordered sequence of subtokens for each of the plurality of commands of the first CLI; and apply a span masking function to each ordered sequence of subtokens to randomly mask out select subtokens, wherein application of the ordered sequence of subtokens of the first CLI with random masked out subtokens trains the deep learning model to learn to predict a replacement token for a masked out subtoken.

In an aspect, the one or more programs include further instructions that: obtain a second pre-training dataset, the second pre-training dataset including a plurality of command sequences of the first command line interface (CLI); and mask out parameter values in the plurality of command sequences of the second pre-training dataset.

In an aspect, the one or more programs include further instructions that: pre-train the deep learning model with the second pre-training dataset, wherein application of the second pre-training dataset trains the deep learning model to learn to predict a replacement parameter value for the masked parameter value.

In an aspect, the one or more programs include further instructions that: generate a data-augmented dataset, wherein the data-augmented dataset includes permutations of commands of the second CLI with corresponding parameters and associated parameter values; and fine-tune the deep learning model with attention with the data-augmented supervised dataset. In an aspect, the permutated commands include masked out parameter values. In one aspect, the deep learning model is a neural transformer model with attention.

A computer-implemented method is performed on a computing device having a processor and a memory. The computer-implemented method comprising: obtaining a query for an example of usage of a command of a command line interface (CLI), the command including a command name; obtaining a template of the command, the template including the command name and at least one parameter without a parameter value; using a deep learning model to generate the parameter value for the at least one parameter given the template; and responding to the query by generating an example including the parameter value generated from the deep learning model.

In an aspect, the deep learning model generates a probability for each parameter value indicating a likelihood of the parameter value corresponding to the at least one parameter. In one aspect, the method further comprises: obtaining k predicted parameter values from the deep learning model for the at least one parameter; and selecting the at least one parameter value from the k predicted parameter values based on a select one of the k predicted parameter values having a highest probability.

In an aspect, the method further comprises: constructing a command sequence having the command, the at least one parameter and a select one of the k predicted parameter values; validating syntax of the command sequence; and selecting the at least one parameter value from the k predicted parameter values based on the at least one parameter value having a syntax-validated command sequence and a highest probability.

In an aspect, selecting the at least one parameter value further comprises checking that the at least one parameter value has a data format consistent with the parameter. In an aspect, the method further comprises: obtaining a description of the command from the template; and incorporating the description into the example. In an aspect, the deep learning model is a neural transformer model with attention.

A device is disclosed comprising: at least one processor and a memory. The at least one processor is configured to perform acts that: train a deep learning model with an unsupervised set of training data, the unsupervised set of training data including a plurality of commands of a first command line interface (CLI), a command including a command name and at least one parameter with a parameter value, wherein a portion of the command is masked out; and train the deep learning model with a supervised set of training data, the supervised set of training data including a plurality of commands of a second CLI, wherein the first CLI and the second CLI differ, wherein a command of the second CLI includes a command name, at least one parameter with a parameter value, wherein the trained deep learning model is trained to output probabilities of a predicted parameter value likely to correspond to an input sequence, the input sequence including a target command and a target parameter.

In an aspect, the at least one processor is configured to perform acts that: deploy the deep learning model in a CLI-based application to generate examples of correct usage of a requested command. In an aspect, the at least one processor is configured to perform acts that: generate a first unsupervised set of training data including a plurality of commands including randomly masked out components; and pre-train the deep learning model with the first unsupervised set of training data.

In an aspect, the at least one processor is configured to perform acts that: generate a second unsupervised set of training data including a plurality of commands including masked out parameter values; and pre-train the deep learning model with the second unsupervised set of training data. In an aspect, the at least one processor is configured to perform acts that: generate an augmented set of supervised training data from known patterns of commands of the second CLI, the augmented set of supervised training data including permutations of a known pattern with selective masking of parameter values; and fine-tune the deep learning model with the augmented set of supervised training data. In an aspect, the deep learning model is a neural transformer model with attention.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
one or more processors; and
a memory that stores one or more programs that are configured to be executed by the one or more processors, the one or more programs including instructions to perform acts that:
obtain a first pre-training dataset, wherein the first pre-training dataset comprises a plurality of commands of a first command line interface (CLI), wherein a command of the plurality of commands of the first CLI comprises a first command name and at least one first parameter having a first parameter value;
pre-train a deep learning model with the first pre-training dataset;
obtain a first fine-tuning dataset, wherein the first fine-tuning dataset comprises a plurality of command sequences of a second CLI, wherein a command sequence of the plurality of command sequences of the second CLI comprises a second command name and a second parameter with a corresponding second parameter value, wherein the first CLI differs from the second CLI; and
fine-tune the deep learning model with the first fine-tuning dataset to learn to predict a target parameter value of a target parameter associated with a given command sequence of the second CLI.

2. The system of claim 1, wherein pre-training the deep learning model with the first pre-training dataset further comprises:
generate an ordered sequence of subtokens for each of the plurality of commands of the first CLI; and
apply a span masking function to each ordered sequence of subtokens to randomly mask out select subtokens, wherein application of the ordered sequence of subtokens of the first CLI with randomly masked out subtokens trains the deep learning model to learn to predict a replacement token for a masked out subtoken.

3. The system of claim 1, wherein the one or more programs include further instructions that:
obtain a second pre-training dataset, the second pre-training dataset including a plurality of command sequences of the first command line interface (CLI); and
mask out parameter values in the plurality of command sequences of the second pre-training dataset.

4. The system of claim 3, wherein the one or more programs include further instructions that:
pre-train the deep learning model with the second pre-training dataset,
wherein application of the second pre-training dataset trains the deep learning model to learn to predict a replacement parameter value for the masked parameter value.

5. The system of claim 1, wherein the one or more programs include further instructions that:
generate a data-augmented supervised dataset, wherein the data-augmented supervised dataset includes permutations of commands of the second CLI with corresponding parameters and associated parameter values; and
fine-tune the deep learning model with attention with the data-augmented supervised dataset.

6. The system of claim 5, wherein the permuted commands include masked out parameter values.

7. The system of claim 1, wherein the deep learning model is a neural transformer model with attention.

8. A computer-implemented method, comprising:
accessing a first pre-training dataset, wherein the first pre-training dataset comprises a plurality of commands of a first command line interface (CLI), wherein a command of the plurality of commands comprises a first command name and a first parameter having a first parameter value;
pre-training a deep learning model with the first pre-training dataset;
accessing a first fine-tuning dataset, wherein the first fine-tuning dataset comprises a plurality of command sequences of a second CLI, wherein a command sequence of the plurality of command sequences of the second CLI comprises a second command name and a second parameter with a corresponding second parameter value, wherein the first CLI differs from the second CLI; and
fine-tuning the deep learning model with the first fine-tuning dataset to learn to predict a target parameter value of a target parameter associated with a given command sequence of the second CLI.

9. The computer-implemented method of claim 8, comprising:
accessing a second pre-training dataset, the second pre-training dataset including a plurality of command sequences of the first command line interface (CLI); and
randomly masking out parameter values in the plurality of command sequences of the second pre-training dataset.

10. The computer-implemented method of claim 9, comprising:
pre-training the deep learning model with the second pre-training dataset,
wherein the pre-training of the deep learning model with the second pre-training dataset trains the deep learning model to learn to predict a replacement parameter value for the randomly masked parameter values.

11. The computer-implemented method of claim 8, comprising:
generating a data-augmented supervised dataset, wherein the data-augmented supervised dataset comprises permutations of commands of the second CLI with corresponding parameters and associated parameter values; and
fine-tuning the deep learning model with attention with the data-augmented supervised dataset.

12. The computer-implemented method of claim 11, wherein the data-augmented supervised dataset comprises masked parameter values for select ones of the corresponding parameters of the permutated commands.

13. The computer-implemented method of claim 11, wherein the data-augmented supervised dataset comprises masked parameters for select ones of the permutated commands.

14. A hardware storage device having stored thereon computer executable instructions that are structured to be executable by a processor of a computing device to thereby cause the computing device to:
- pre-train a deep learning model with an unsupervised set of training data, wherein the unsupervised set of training data comprises a plurality of commands of a first command line interface (CLI), wherein a command comprises a first command name and a first parameter with a first parameter value; and
- fine-tune the deep learning model with a supervised set of training data, wherein the supervised set of training data comprises a plurality of commands of a second CLI, wherein the first CLI and the second CLI differ, wherein a command of the second CLI comprises a second command name, a second parameter with a second parameter value,
- wherein the deep learning model is fine-tuned to learn to predict a target parameter value of a target parameter associated with a given command sequence of the second CLI.

15. The hardware storage device of claim 14, wherein the deep learning model generates an example of correct usage of a requested command in a CLI-based application.

16. The hardware storage device of claim 14, wherein the deep learning model comprises a neural transformer model with attention.

17. The hardware storage device of claim 14, having stored thereon computer executable instructions that are structured to be executable by the processor of the computing device to thereby cause the computing device to:
- generate the first unsupervised set of training data with randomly masked out tokens of ones of the plurality of commands of the first CLI.

18. The hardware storage device of claim 14, having stored thereon computer executable instructions that are structured to be executable by the processor of the computing device to thereby cause the computing device to:
- generate a second unsupervised set of training data comprising a plurality of commands having masked out parameter values; and
- pre-train the deep learning model with the second unsupervised set of training data.

19. The hardware storage device of claim 14, having stored thereon computer executable instructions that are structured to be executable by the processor of the computing device to thereby cause the computing device to:
- generate an augmented set of supervised training data from known patterns of commands of the second CLI, wherein the augmented set of supervised training data comprises permutations of a known pattern with selective masking of parameter values; and
- fine-tune the deep learning model with the augmented set of supervised training data.

20. The hardware storage device of claim 14, wherein the first pre-training dataset comprises a plurality of commands of a third CLI, wherein the third CLI differs from the first CLI and the second CLI.

* * * * *